(12) United States Patent
Zhao et al.

(10) Patent No.: US 10,645,634 B2
(45) Date of Patent: May 5, 2020

(54) METHOD AND APPARATUS FOR SENDING AND BROADCASTING RESOURCE INFORMATION

(71) Applicant: China Academy of Telecommunications Technology, Beijing (CN)

(72) Inventors: Li Zhao, Beijing (CN); Jiye Tang, Beijing (CN); Lin Lin, Beijing (CN); Jiayi Fang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 15/751,475

(22) PCT Filed: Jul. 27, 2016

(86) PCT No.: PCT/CN2016/091948
§ 371 (c)(1),
(2) Date: Feb. 9, 2018

(87) PCT Pub. No.: WO2017/024944
PCT Pub. Date: Feb. 16, 2017

(65) Prior Publication Data
US 2018/0234911 A1    Aug. 16, 2018

(30) Foreign Application Priority Data

Aug. 12, 2015 (CN) .......................... 2015 1 0494562

(51) Int. Cl.
*H04W 48/10*    (2009.01)
*H04W 4/06*     (2009.01)
(Continued)

(52) U.S. Cl.
CPC ............. *H04W 48/10* (2013.01); *H04W 4/06* (2013.01); *H04W 72/005* (2013.01);
(Continued)

(58) Field of Classification Search
CPC ..... H04W 48/10; H04W 4/06; H04W 72/005; H04W 72/04; H04W 48/12;
(Continued)

(56) References Cited

U.S. PATENT DOCUMENTS

2013/0336142 A1\* 12/2013 Dimou .............. H04W 72/1231
370/252
2014/0269604 A1    9/2014 Kamiya et al.
(Continued)

FOREIGN PATENT DOCUMENTS

CN        103209492 A     7/2013
CN        103220814 A     7/2013
(Continued)

OTHER PUBLICATIONS

ZTE: "Discussions on General Aspects of D2D UE-to-network Relay", 3GPP Draft; R1-152965 D2D Network-To-UE Relay, 3rd Generation Partnership Project (3GPP), Mobile Competence Centre; May 16, 2015, 4 pages.
(Continued)

*Primary Examiner* — Kibrom T Hailu
(74) *Attorney, Agent, or Firm* — Kilpatrick Townsend & Stockton, LLP (57) ABSTRACT

Disclosed are a method and apparatus for sending and broadcasting resource information, the method comprising: determining a resource used by a second-type node and a resource used by a first-type node, and determining the first-type node receiving a resource coordination message, wherein the first-type node is a node located within a base station signal coverage range, and the second-type node is a
(Continued)

node located outside of the base station signal coverage range; and sending the resource coordination message to the determined first-type node, and instructing the first-type node to broadcast the contents of the resource coordination message, wherein the resource coordination message carries resource information about the first-type node and the second-type node. By means of the present application, resource continuity in the process of a node moving on a network coverage edge is guaranteed, resource collision is reduced, and the utilization rate of system resources is improved.

13 Claims, 4 Drawing Sheets

(51) Int. Cl.
  *H04W 72/04* (2009.01)
  *H04W 72/00* (2009.01)
  *H04W 48/12* (2009.01)
(52) U.S. Cl.
  CPC ............ *H04W 72/04* (2013.01); *H04W 48/12* (2013.01); *H04W 72/048* (2013.01)
(58) Field of Classification Search
  CPC ... H04W 72/048; H04W 92/18; H04W 76/14; H04W 4/70; H04W 72/10; H04W 72/082; H04W 74/0808
  See application file for complete search history.

(56) References Cited

U.S. PATENT DOCUMENTS

| | | | | |
|---|---|---|---|---|
| 2015/0215903 | A1* | 7/2015 | Zhao | H04W 72/04 370/329 |
| 2016/0037549 | A1* | 2/2016 | Seo | H04W 76/14 370/329 |
| 2016/0044668 | A1* | 2/2016 | Yoon | H04L 5/14 370/280 |
| 2017/0187558 | A1* | 6/2017 | Yasukawa | H04B 1/10 |

FOREIGN PATENT DOCUMENTS

| | | |
|---|---|---|
| CN | 103813469 A | 5/2014 |
| CN | 104703224 A | 6/2015 |
| WO | 2015047167 A1 | 4/2015 |

OTHER PUBLICATIONS

Intel Corporation: Resource allocation signaling for D2D communication, 3GPP Draft; R2-141223 Final, 3rd Generation Partnership Project (3GPP), Mobile Competence Centre; Mar. 22, 2014, 6 pages.

Fukuoka, "Discussion on resource assignment to support UE-to-Network relay", Huawei, HiSilicon, 3GPP TSG RAN WGl Meeting #81, RI-152467, May 25-29, 2015, 4 pages.

\* cited by examiner

METHOD AND APPARATUS FOR SENDING AND BROADCASTING RESOURCE INFORMATION

This application is a National Stage of International Application No. PCT/CN2016/091948, filed Jul. 27, 2016, which claims priority to Chinese Patent Application No. 201510494562.0, filed Aug. 12, 2015, both of which are hereby incorporated by reference in their entireties.

FIELD

The present application relates to the field of wireless communications, and particularly to a method and apparatus for transmitting resource information, and a method and apparatus for broadcasting resource information.

BACKGROUND

In an internet of vehicles communication system in which the vehicles are secured actively, information about the vehicles and roads is acquired through the wireless communication technology, and the information is exchanged and shared between the vehicles, and between the vehicles and the roads, so that the vehicles and the infrastructure interoperate and cooperate intelligently with each other for the purpose of optimizing the utilization of system resources, improving the security of traffic on the roads, improving an experience of drivers, and alleviating traffic congestion.

The cooperative vehicle-infrastructure communication system needs to guarantee the low delay and high reliability characteristics of a road safety application. Allocation, scheduling and coordination of the resources is executed by a cellular network in a coverage area of the network, and allocation, scheduling and coordination of the resources is coordinated by respective nodes in a distributed manner in the cooperative vehicle-infrastructure communication system outside the coverage area of the cellular network. Since allocation, scheduling and coordination of the resources is coordinated by different entities in and outside the coverage area of the cellular network, if a vehicle is moving from in the coverage area of the network to outside the coverage area of the network, or from outside the coverage area of the network to in the coverage area of the network, then there may occur resource collision, and the road safety application may be interrupted.

SUMMARY

Embodiments of the application provide a method and apparatus for transmitting resource information, and a method and apparatus for broadcasting resource information so as to enable nodes both inside and outside a coverage area of a base station to acquire related resource usage information, so that even if a node is moving from inside to outside the coverage area of the network, or from outside to inside the coverage area of the network, then no resource collision will occur, and information transmission will be avoided from being interrupted.

An embodiment of the application provides a method for transmitting resource information, the method including: determining a resource accessed by a second type of node, and a resource accessed by a first type of node, wherein the first type of node is a node in a signal coverage area of a base station, and the second type of node is a node out of the signal coverage area of the base station; determining a node of the first type to receive a resource coordination message; and transmitting the resource coordination message to the determined node of the first type, and instructing the determined node of the first type to broadcast a content of the resource coordination message, wherein the resource coordination message carries resource information of the first type of node, and resource information of the second type of node.

Optionally the determining the resource accessed by the second type of node includes: determining the resource accessed by the second type of node according to interference information.

Optionally the interference information is determined by receiving the interference information reported by the first type of node.

Optionally before the resource coordination message is transmitted to the determined node of the first type, the method further includes: adjusting a resource accessed by a related node of the first type according to the reported interference information; and transmitting the resource coordination message to the determined node of the first type includes: transmitting the resource coordination message to the determined node of the first type by enabling information about adjusted resource accessed by the first type of node as the resource information of the first type of node carried in the resource coordination message.

Optionally if it is determined from the interference information that the first type of node reporting the interference information cannot decode a received transmitted signal due to interference, then the resource coordination message carries information about the resource accessed by the second type of node, determined according to the interference information reported by the first type of node; or if it is determined from the interference information that the first type of node reporting the interference information is capable of decoding the received transmitted signal despite the interference, then the resource coordination message carries the information about the resource accessed by the second type of node, determined according to the interference information reported by the first type of node, and the resource coordination message further carries an identifier of a terminal for which the transmitted signal can be decoded.

Optionally determining the node of the first type to receive the resource coordination message includes: determining a node of the first type capable of determining the resource accessed by the second type of node according to the interference information reported by the first type of node as the node of the first type to receive the resource coordination message.

Optionally instructing the determined node of the first type to broadcast the content of the resource coordination message is executed by instructing the determined node of the first type to broadcast the content of the resource coordination message in a D2D communication area thereof.

Optionally the first type of node is a node requesting the base station to transmit the resource coordination message.

Optionally the first type of node is a node receiving different D2D SSs.

An embodiment of the application provides a method for broadcasting resource information, the method including: receiving a resource coordination message transmitted by a base station, and being instructed by the base station to broadcast a content of the resource coordination message, wherein the resource coordination message carries resource information of a first type of node, and resource information of a second type of node, and the first type of node is a node in a signal coverage area of the base station, and the second type of node is a node out of the signal coverage area of the base station; and broadcasting the content of the resource coordination message.

Optionally the method further includes: reporting interference information to the base station.

Optionally the method further includes: indicating in the interference information that a received transmitted signal cannot be decoded due to interference, or the received transmitted signal can be decoded despite the interference; and if the interference information indicates that the received transmitted signal cannot be decoded due to the interference, then the resource coordination message carries information about the resource accessed by the second type of node, determined according to the interference information reported by a first type of node; or if the interference information indicates that the received transmitted signal can be decoded despite the interference, then the resource coordination message carries the information about the resource accessed by the second type of node, determined according to the interference information reported by the first type of node, and further carries an identifier of a terminal for which the transmitted signal can be decoded.

Optionally before receiving the resource coordination message transmitted by the base station, the method further includes: transmitting a request for the resource coordination message to the base station.

Optionally transmitting the request for the resource coordination message to the base station includes: transmitting the request for the resource coordination message to the base station upon determining that different D2D SSs are received.

Optionally broadcasting the content of the resource coordination message includes: broadcasting the content of the resource coordination message in a D2D communication area.

An embodiment of the application provides an apparatus for transmitting resource information, the apparatus including: a resource determining module configured to determine a resource accessed by a second type of node, and a resource accessed by a first type of node, wherein the first type of node is a node in a signal coverage area of a base station, and the second type of node is a node out of the signal coverage area of the base station; a node determining module configured to determine a node of the first type to receive a resource coordination message; and a message transmitting module configured to transmit the resource coordination message to the determined node of the first type, and to instruct the determined node of the first type to broadcast a content of the resource coordination message, wherein the resource coordination message carries resource information of the first type of node, and resource information of the second type of node.

Optionally the resource determining module is further configured to determine the resource accessed by the second type of node according to interference information.

Optionally the apparatus further includes: an interference receiving module configured to receive the interference information reported by the first type of node; and the resource determining module is further configured to determine the resource accessed by the second type of node according to the interference information reported by the first type of node.

Optionally the resource determining module is further configured to adjust a resource accessed by a related node of the first type according to the reported interference information, before transmitting the resource coordination message to the determined node of the first type; and the message transmitting module is further configured to transmit the resource coordination message to the determined node of the first type by enabling information about adjusted resource accessed by the first type of node as the resource information of the first type of node carried in the resource coordination message.

Optionally the message transmitting module is further configured, if it is determined from the interference information that the first type of node reporting the interference information cannot decode a received transmitted signal due to interference, to carry in the resource coordination message information about the resource accessed by the second type of node, determined according to the interference information reported by the first type of node; or if it is determined from the interference information that the first type of node reporting the interference information is capable of decoding the received transmitted signal despite the interference, to carry in the resource coordination message the information about the resource accessed by the second type of node, determined according to the interference information reported by the first type of node, and to further carry in the resource coordination message an identifier of a terminal for which the transmitted signal can be decoded.

Optionally the node determining module is further configured to determine the node of the first type to receive the resource coordination message by determining a node of the first type capable of determining the resource accessed by the second type of node according to the interference information reported by the first type of node as the node of the first type to receive the resource coordination message.

Optionally the message transmitting module is further configured to instruct the determined node of the first type to broadcast the content of the resource coordination message by instructing the determined node of the first type to broadcast the content of the resource coordination message in a D2D communication area thereof.

Optionally the first type of node is a node requesting the base station to transmit the resource coordination message.

Optionally the first type of node is a node receiving different D2D SSs.

An embodiment of the application provides an apparatus for broadcasting resource information, the apparatus including: a message receiving module configured to receive a resource coordination message transmitted by a base station, and to be instructed by the base station to broadcast a content of the resource coordination message, wherein the resource coordination message carries resource information of a first type of node, and resource information of a second type of node, and the first type of node is a node in a signal coverage area of the base station, and the second type of node is a node out of the signal coverage area of the base station; and a message broadcasting module configured to broadcast the content of the resource coordination message.

Optionally the apparatus further includes: an interference reporting module configured to report interference information to the base station.

Optionally the interference reporting module is further configured to indicate in the interference information that a received transmitted signal cannot be decoded due to interference, or the received transmitted signal can be decoded despite the interference; and the message receiving module is further configured, if the interference information indicates that the received transmitted signal cannot be decoded due to the interference, to receive the resource coordination message carrying information about the resource accessed by the second type of node, determined according to the interference information reported by the first type of node; or if the interference information indicates that the received transmitted signal can be decoded despite the interference, to receive the resource coordination message carrying the information about the resource accessed by the second type of node, determined according to the interference information reported by the first type of node, and further carrying an identifier of a terminal for which the transmitted signal can be decoded.

Optionally the apparatus further includes: a request transmitting module configured to transmit a request for the resource coordination message to the base station before receiving the resource coordination message transmitted by the base station.

Optionally the request transmitting module is further configured to transmit the request for the resource coordination message to the base station upon determining that different D2D SSs are received.

Optionally the message broadcasting module is further configured to broadcast the content of the resource coordination message by broadcasting the content of the resource coordination message in a D2D communication area.

Advantageous effects of the application are as follows: in the technical solutions according to the embodiments of the application, after the resource access condition(s) of the node(s) outside the coverage area are determined, and the resource access information of the node(s) in the coverage area is obtained, the resource access information of the node(s) is transmitted to the related node(s), and the related node(s) is instructed to broadcast the resource access information, so that apparently all the nodes in and out of the coverage area of the base station can obtain the related resource access information, for example, when the node broadcasting the information is located at the edge of the coverage area of the base station. And when all the nodes in and out of the coverage area can obtain the related resource access information, even when the node(s) is moving from in the coverage area of the network to outside the coverage area of the network, or from outside the coverage area of the network to in the coverage area of the network, no resource collision will occur, and also information transmission will be avoided from being interrupted.

BRIEF DESCRIPTION OF THE DRAWINGS

The drawings described here are intended to provide further understanding of the application, and constitute a part of the application, and the exemplary embodiments of the application and the description thereof are intended to set forth the application, but not to limit the application unduly.

In the drawings.

DETAILED DESCRIPTION OF THE EMBODIMENTS

Particular embodiments of the application will be described below with reference to the drawings.

The inventors have identified during making of the application that; there is a high requirement for communication delay in the internet of vehicles system in which the vehicles are secured actively, so the ad-hoc network technologies for communication over a short distance are generally applied. At present in the field of the internet of vehicles, there are generally two categories of ad-hoc network technologies dependent upon the form of radio resource being accessed, where one category is the IEEE 802.11p based Dedicated Short Range Communication (DSRC) technologies relating to an ad-hoc network for asynchronous communication; and the other category is an ad-hoc network for synchronous communication represented by Mobile Slotted Aloha (MS-Aloha).

In the cellular mobile communication system, an approach of centralized control by the network is adopted, where terminals are controlled by the network to transmit and receive data, radio resources are allocated by the system network, and data are transmitted over the network. In order to satisfy a specific communication demand, discussions and studies about direct services between terminals have been also made in the 3GPP organization. In the 3GPP, Long Term Evolution (LTE) based direct communication between terminals is referred to as the Device-to-Device (D2D) technology and a research team about D2D has been established.

In D2D communication involving the cellular network, terminals communicate with each other by establishing a direct air-interface link over the cellular network. As compared with the traditional cellular network, D2D communication involving the cellular network can improve the capacity of the network, extend the coverage area of the network, and have the capability of efficient location awareness. As compared with the traditional cellular network, D2D communication involving the cellular network can provide higher security, and a guaranteed better Quality of Service (QoS). As for an operator, a cost per bit can be lowered to thereby save its investment, and more new services can be offered.

However in this solution, a transmission resource of an edge node inside the coverage area of the base station is centrally scheduled by the base station, and a transmission resource outside the coverage area of the base station is determined by the distributed resource allocation mechanism, so a drawback thereof lies in that there is currently absent a resource coordination mechanism, and since scheduling and allocation of the resources is controlled by different resource control entities, and there is a rapidly varying topology, the spatial multiplexing condition may not be satisfied, thus resulting in resource collision. Particularly the following solutions in the prior art will be described.

In the first solution in the prior art, an offline timer is arranged, and a timeslot is marked as occupied by an offline node.

When the base station determines that some node may be offline, a timeslot currently accessed by the node is marked as an offline timeslot, timeslot resources of nodes in the current cell need to be coordinated by taking into account the offline timeslot (this timeslot resource cannot be accessed by such a node in the cell that lies in a range of interaction with an offline area), and also starting an offline judgment timer, and before the offline judgment timer expires, if information of the node (a Tacking Area (TA), a position report, a channel measurement quantity, etc.) is further received, then the offline judgment timer will be disabled, and the offline timeslot attribute of the timeslot will be deleted; otherwise, it will be determined that the node is offline. For the node determined offline, an offline timeslot timer is started for the timeslot, and when the offline timeslot timer does not expires, the timeslot resources of the nodes in the current cell need to be coordinated by taking into account the offline timeslot. After the offline timeslot timer expires, the offline attribute of the timeslot is deleted.

It shall be further noted that the base station can determine as follows that a node leaves the current cell.

1) A Device-to-Node (D2N) link channel measurement quantity.
2) A TA.
3) A reported position.

When no report quantity has been received from the node for a period of time, it is determined that the node may have left the current cell. It is further determined whether the node may be offline, according to the particular positional information and moving trace reported by the node.

With the solution above, the base station allocating a timeslot resource for a node in the current cell can avoid as much as possible the timeslot resource from colliding with the timeslot of the node moving from the current cell and going offline. Possible collision with another offline node is detected via collision detection method as follows: an online node detects strong interference according to underlying measurement quantities (a Signal to Interference plus Noise Ratio (SINR) and total received power), and then reports this to the base station; when the base station determines that a timeslot of some node collides with that of another node than in the current cell, according to a strong interference indicator reported by the node, positional information of the reporting node, and timeslot occupancy information of the node, the base station transmits a special collision indicator, and a resource for the node to report an optional timeslot, to the node, and the colliding node aborts an access to the timeslot resource, suggests some optional idle timeslots according to its underlying measurements (an SINR and total received power), and reports them to the base station for selection by the base station; and the base station determines a final timeslot for the node according to such information in combination with timeslot occupancy conditions of the other nodes in the network.

A timeslot of an offline node is detected as follows: the offline node needs to indicate an online node in a Format Identifier (FI), and an adjacent node demodulates only one-hop is represented by a special Statistics Time Interval (STI), so that the offline nodes interoperate and interact with each other to thereby avoid as much as possible the resource of any offline node from colliding with that of an online node.

For a node just accessing the network from an offline state, in the case that the base station allocates a resource, the accessing node needs to report a timeslot currently occupied by the node to the base station, so that the base station determines whether to let the node continue its access to the timeslot resource, or to change it to a new timeslot resource.

For a node just switching from an online state to an offline state, if it does not detect any collision, then it will continue its access to its existing timeslot resource.

In this solution, the offline timer is arranged, and some timeslot is marked as occupied by an offline node, so it cannot be scheduled centrally any longer. An offline scenario is determined dependent upon D2N measurement, a TA, and a position report.

Drawbacks thereof lies in that: in the original solution, the offline judgment is not accurate, setting of the timing length of the offline timer is complicated, and even if the offline timer expires, it will not indicate whether the offline timeslot satisfies the spatial multiplexing condition; and the offline timeslot is not determined upon whether spatial multiplexing is available under a practical condition, thus degrading the utilization ratio of the resources.

In a second technical solution in the prior art, a pool of cooperating resources is arranged.

There is such an area around the base station that is not covered by the network, and a part of the network needs to be planned in advance as follows: an offline node and the base station can access all the timeslot resources, but they need to mark a part of the resources as special resources to constitute a pool of special resources, and need to access the timeslot resources in the pool of special resources when some condition is satisfied.

1) For an offline node, the pool of special resources is also referred to as a pool of offline cooperating resources. When the offline node determines that there is an online node around it, as a result of monitoring and detection, e.g., preamble detection, it adjusts its timeslot resource actively to determine that the accessed timeslot resource is a resource in the pool of offline cooperating resources. When the offline node does not detect any online node, it can access any timeslot resource. Configuration of the pool of offline cooperating resources can be retrieved by the node from the network when it is located in a network-covered area adjacent to the area that is not covered by the network.

2) When the base station allocates a resource for an online node, the pool of special resources is also referred to as a pool of online cooperating resources. The base station allots a special area, and allocates a timeslot resource for a node in the special area (an edge area) to detect and report an offline node. When a network node in the special area (the edge area) determines that there is an offline node around it, as a result of monitoring and detection, e.g., preamble detection, it reports this to the base station to trigger the base station to allocate a resource for the node in the special area (i.e., the edge area), where only a resource in the pool of online cooperating resources can be allocated. After the base station has not received such information for a period of time, it will be determined that there is no offline node. At this time, when the base station allocates a resource, it is only necessary to avoid the timeslot collision between the nodes in the cell of the base station and to coordinate the timeslots occupied by the cell of the base station and other cells, and there is no need to take account into the cooperation with an offline node.

It shall also be noted that: the pool of online cooperating resources, and the pool of offline cooperating resources are well pre-configured statically, and these pools of resources can only be accessed by an edge node. For an offline node, it will be an edge node only if it detects an online node; and for an online node, the base station determines this primarily according to the geographical position.

Information between an offline node and an online node is received and processed as follows.

1) Reception: a frequency division scheme is applied to the online node, an entire frequency band of resources is occupied by the offline node, and a frequency division factor is well pre-configured; and for the offline node, once it is determined from a preamble, etc., that an offline node exists, the information can be received via a multiple blind reception scheme, and the information can be received firstly in a sub-frequency band (half a frequency band), and then throughout the frequency band. The same will apply to the online node.

2) Decoding: when the offline node transmits an FI, and the online node does not transmit any FI, their message formats are different from each other, and a one-bit indicator is added to a frame header to indicate whether there is an FI, to thereby facilitate decoding.

3) Processing after reception: when the offline node transmits an FI, and the online node does not transmit any FI, the offline node may or may not characterize the online node in the FI. In the former case, only a one-hop online node decoded correctly needs to be characterized, and for the online node, it is characterized by a special STI, including one-hop occupancy and two-hop occupancy.

Since there are different pools of resources, the timeslot of the offline node will not collide with the timeslot of the online node in the edge area, and also because of the area division, the timeslot of the offline node will not collide with the timeslot of the online node in the non-edge area that one of the timeslots may be reused.

In these two schemes, an online node can be avoided in effect from colliding with an offline node.

For a node just accessing the network from an offline state, in the case that the base station allocates a resource, the accessing node needs to report a timeslot currently occupied by the node to the base station, so that the base station determines whether to let the node continue its access to the timeslot resource, or to change it to a new timeslot resource. If it is determined that there is an offline node around the node, as a result of detection by the node, then a resource in the pool of online cooperating resources will be allocated for the node. If it is determined that there is no offline node around the node, then it will only be considered whether there is interference of the new node to existing users in the network.

For a node just switching from an online state to an offline state, the previous resource thereof is given up immediately, and a timeslot resource is reselected in the pool of offline cooperating resources. Only when the timeslot of the node fails, and a timeslot is reselected, if it is detected from a preamble thereof that there is no offline node around the node, then a timeslot resource will be selected in the entire pool of resources.

In this solution, the orthogonal pools of special resources are preset statically in the offline node, and the nodes in the coverage area of the base station to thereby avoid timeslot collision.

A drawback thereof lies in that the pool of special resources for the edge area is configured statically, so the resources are not configured flexibly; and when the node is switching from an online state to an offline state, a timeslot shall be reselect, which may disagree with the design principle of service continuity.

Hereupon the application proposes a network based resource coordination scheme, where an edge node in a coverage area of the network transmits a resource coordination message, so that resources of the edge node in the coverage area, and of a node outside the coverage area are coordinated to thereby guarantee continuity of the resource for the node moving at the edge of the coverage area of the network so as to alleviate resource collision, and to improve the utilization ratio of the resources in the system. This will be described below.

In the following description, implementations at the node side and the base station side will be described respectively, but this will not suggest that both of them shall cooperate in operation, and indeed, when the node and the base station operate separately, they can also address the problems at the node side and the base station side respectively, although a better technical effect will be achieved when both of them operate together.

Figure 1:
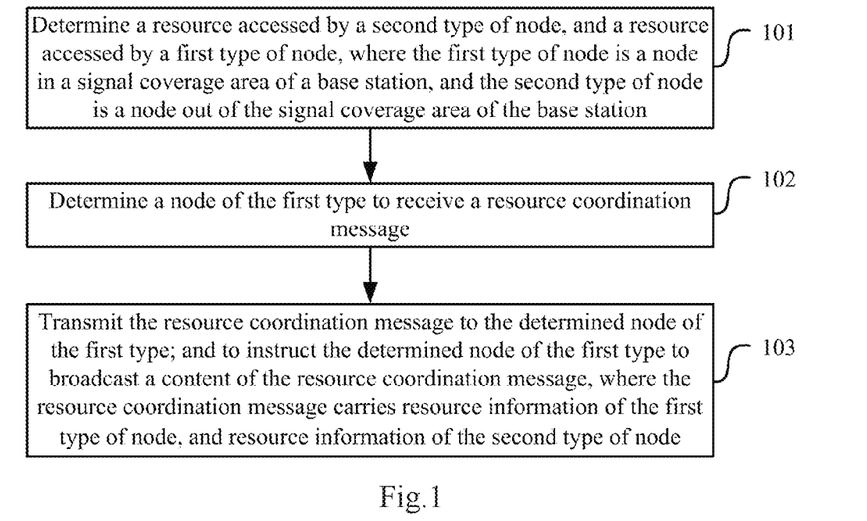
FIG. 1 is a schematic flow chart of a method for transmitting resource information at the base station side according to an embodiment of the application.

FIG. 1 is a schematic flow chart of a method for transmitting resource information at the base station side, and as illustrated, the method can include the following operations.

The operation 101 is to determine a resource accessed by a second type of node, and a resource accessed by a first type of node, where the first type of node is a node in a signal coverage area of a base station, and the second type of node is a node out of the signal coverage area of the base station.

The operation 102 is to determine a node of the first type to receive a resource coordination message.

The operation 103 is to transmit the resource coordination message to the determined node of the first type; and to instruct the determined node of the first type to broadcast a content of the resource coordination message, where the resource coordination message carries resource information of the first type of node, and resource information of the second type of node.

In an implementation, the resource accessed by the second type of node can be determined according to interference information.

In a particular implementation, the interference information can be interference information reported by the first type of node.

Figure 2:
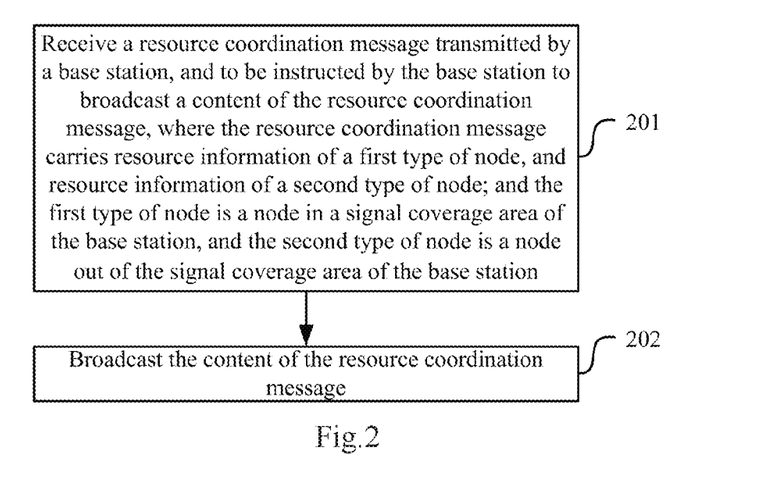
FIG. 2 is a schematic flow chart of a method for broadcasting resource information at the node side according to an embodiment of the application.

FIG. 2 is a schematic flow chart of a method for broadcasting resource information at the node side, and as illustrated, the method can include the following operations.

The operation 201 is to receive a resource coordination message transmitted by a base station, and to be instructed by the base station to broadcast a content of the resource coordination message, where the resource coordination message carries resource information of a first type of node, and resource information of a second type of node; and the first type of node is a node in a signal coverage area of the base station, and the second type of node is a node out of the signal coverage area of the base station.

The operation 202 is to broadcast the content of the resource coordination message.

Firstly a node of the first type, at an "edge" of the coverage area of the base station, to implement the solutions according to the application will be described below.

For resource occupancy information for avoiding resource collision, in the coverage area of the base station, for a node of the first type to obtain the resource occupancy information of the nodes, if it is "inside" the coverage area, then it will be subjected to less interference from the second type of node outside the coverage area, so it will not obtain any resource access condition of the second type of node, and the resource access condition of the first type of node can be coordinated by the base station, so the node "inside" the coverage area actually may not need any resource occupancy information, but the node of the first type at the "edge" of the coverage area needs to obtain the resource occupancy information.

For a node of the second type, out of the coverage area of the base station, to obtain the resource occupancy information of the nodes, since it obtains such information broadcasted from the node of the first type, and a broadcast area of the node of the first type is smaller than the coverage area of the base station, actually it can also obtain the resource access information broadcasted by the node of the first type at the "edge" of the coverage area.

In summary, in an implementation, the area of the "edge" can be determined according to an interference area, and the broadcast area, that is, the node of the first type at the "edge" of the coverage area can be selected according to both of them to implement the solutions above.

Since information is transmitted wirelessly between a node and the base station, the interference and broadcast areas for delimiting the "edge" are theoretically unlimited except that the strength of a signal is high or low, but in an implementation, the "edge" in the application, which is the most appropriate for being delimited by the interference and broadcast areas can be given. In a particular implementation, it can be determined as follows.

The interference range can be categorized into a strong interference range and a relatively strong interference range, where the strong interference refers to such strong interference that none of transmitted signals can be decoded; and the relatively strong interference refers to such strong interference that at least one of transmitted signal can be decoded successfully.

The broadcast area can refer to a D2D communication area.

They will be further described below in particular examples.

With the solutions in FIG. 1 and FIG. 2, the base station can configure the node at the edge of the coverage area to transmit the centralized resource scheduling information, so that the node out of the coverage area can obtain the resource occupancy condition of the node at the edge of the coverage area, thus avoiding resource collision. This will be described below in connection with implementations thereof at the base station side and the node side, and in the following description, the term "edge" will be used for the sake of convenient understanding, and reference can be made to the description above for the definition of the term.

The solutions generally include the following operations.

1) A node at the edge of the coverage area of the base station determines that it is located at the edge of the coverage area of the base station, and that there is a node out of the coverage area of the base station around it, and the node at the edge of the coverage area reports a request to the base station for configuring a resource coordination message.

2) The base station organizes and transmits a resource coordination message for centralized scheduling according to the request reported by the node at the edge of the coverage area of the network, and interference information reported by a node in the coverage area of the network.

3) The node at the edge of the coverage area of the base station organizes and transmits the resource coordination message for centralized scheduling.

4) The node out of the coverage area of the base station analyzes a possible resource collision condition upon reception of the resource coordination message, and adjusts a resource with possible collision.

In a particular implementation, the node of the first type at the edge of the coverage area can be a node receiving different D2D Synchronization Sequences (SSs), that is, the node can determine as follows that it is located at the edge of the coverage area of the base station, and that there is a node, out of the coverage area, around it.

Since the priority of such a UE in a coverage area of an eNB that acts as a reference synchronization source is higher than that of a UE out of the coverage area, and a D2D Synchronization Sequence (SS) can distinguish synchronization from an eNB from synchronization from a UE, the node at the edge of the coverage area of the base station determines as follows that there is a node, out of the coverage area, around it.

When the node is located in the coverage area of the base station, and Reference Signal Received Power (RSRP) of a D2N link measured by the node is below a threshold, a D2D SS needs to be transmitted.

Also the node receives a D2D SS transmitted by a node out of the coverage area, and since there are different D2D SSs of nodes in and out of the coverage area of an eNB, it can be determined that the node is located at the edge of the coverage area of the base station, and that there is a node, out of the coverage area, around it.

In an implementation, a request for a resource coordination message can be transmitted to the base station.

Furthermore the request for the resource coordination message can be transmitted to the base station upon determining that different D2D SSs are received.

In a particular implementation, when it is the first time for a node to satisfy the condition that it is located at the edge of the coverage area of the base station, and there is a node, out of the coverage area, around it, it reports a transmission request message to the base station, where the message can further include the following contents: the identity (ID) of the node; positional information of the node: a longitude, a latitude, and a lane; and traveling information of the node: a velocity, a traveling direction, and an acceleration or deceleration.

In an implementation, the base station organizes and transmits the resource coordination message for centralized scheduling according to the request reported by the node at the edge of the coverage area of the network, and the interference information reported by a node in the coverage area of the network.

The node in the coverage area of the network may report interference in the following instances.

1) Strong interference is reported: the receiving node cannot decode any received transmitted signal due to too strong interference.

The node in the coverage area detects and reports strong interference to the base station.

The base station searches for information about a centrally scheduled node according to a timeslot resource with strong interference.

If a node with resource collision is found in the coverage area of the base station, then the resource will be reallocated for the node in the coverage area of the base station, that is, in an implementation, before the resource coordination message is transmitted to the node of the first type, the method can further include: adjusting a resource accessed by a related node of the first type according to the reported interference information; and accordingly when the resource coordination message is transmitted to the node of the first type, the resource information of the first type of node carried in the resource coordination message is information about adjusted resource accessed by the first type of node.

If no information about any node with resource collision is found, then it will indicate that there will be a node with resource collision out of the coverage area of the network.

2) Relatively strong interference is reported: although the receiving node receives relatively strong interference, it can decode successfully one of received transmitted signals.

The node in the coverage area detects and reports relatively strong interference to the base station.

The base station searches for a centrally scheduled node according to a timeslot resource with relatively strong interference.

If a node with resource collision is found in the coverage area of the base station, then if it is determined that resource collision occurs, then the resource will be reallocated for the node in the coverage area of the base station; or if it is determined that no resource collision occurs, then no further process will be performed.

If no information about any node with resource collision is found, then it will indicate that there will be a node with resource collision out of the coverage area of the network, and in order to guarantee reliable reception out of the coverage area, resource collision information will subsequently be broadcasted by the node at the edge of the coverage area.

When the base station receives a message reported by a node, the message may be one of the following two categories of messages.

1) A resource coordination request message reported by a node at the edge of the coverage area of the base station.

2) Strong interference information or relatively strong interference information reported by a node in the coverage area of the base station.

Thus when a node of the first type capable of determining the resource accessed by the second type of node according to the reported interference information is determined, and the node of the first type to receive the resource coordination message is determined from the node of the first type capable of determining the resource accessed by the second type of node, where the node is a vehicle, for example, the base station can select a transmitting node according to the position and traveling information of the vehicle (the node of the first type) as follows.

1) Only an edge UE reporting a resource coordination request message, e.g., the furthest node at the edge of the coverage area from the base station, is selected.

2) A part or all of edge UEs reporting resource coordination request messages are selected according to a resource condition of the base station.

In an implementation, when the node of the first type to receive the resource coordination message is determined, apparently the resource coordination message is transmitted for the purpose of avoiding resource collision between the respective nodes in and out of the coverage area so that information can be transmitted, so only a node to transmit and receive information, and a node for which resource collision needs to be avoided will be determined, and the node of the first type to receive the resource coordination message can be determined accordingly in combination with physical positions, moving status of respective nodes. Of course, various rules for determining the node to receive the resource coordination message can be set in practice as needed or for other purposes.

In an implementation, in the case that a plurality of UEs transmit resource coordination request messages, the plurality of nodes transmitting the same message contents can broadcast the messages synchronously at the same time, or no matter whatever message contents, transmission resources can be allocated respectively for the plurality of UEs, so that they can transmit the resource coordination request messages respectively.

In an implementation, the resource coordination message carries the resource information of the first type of node, and resource information of the second type of node, and particularly for the transmitting node selected above, node information, transmitted by the base station to the reporting node, to assist in resource coordination can include the following two categories of information.

1) Resource Occupancy Information of a Node in the Coverage Area of the Base Station.

Information about a node centrally scheduled and allocated by the base station within the spatial multiplexing distance from the edge node to the base station includes the following contents: an ID of the node in the coverage area of the base station; and resource occupancy information of the node in the coverage area of the base station.

2) Resource Collision Information of a Node Out of the Coverage Area of the Base Station.

The base station organizes the resource collision information of the node, out of the coverage area of the base station, determined by the node at the edge of the coverage area of the base station, including the following contents: resource occupancy information of the node out of the coverage area of the base station.

In an implementation, the resource coordination message is transmitted to the node of the first type, and the node of the first type is instructed to broadcast the content of the resource coordination message, and particularly the base station schedules the node at the edge of the coverage area to transmit the resource coordination message for centralized scheduling, and the node at the edge of the coverage area of the base station receives the resource coordination message transmitted by the base station, and organizes and transmits the resource coordination message for centralized scheduling by broadcasting it.

In an implementation, the node out of the coverage area of the base station receives the resource coordination message, and may adjust its resource with possible collision; and particularly the node out of the coverage area of the base station receives the resource coordination message as an input for making a distributed resource collision judgment, analyzes it for possible resource collision, and adjusts its resource with possible collision.

Examples will be described below.

It shall be noted that the nodes in the embodiments are exemplified as vehicles, and in the following description, the nodes include: a node transmitting a request to the base station for a resource coordination message, e.g., the vehicle A, where the node receives different D2D SSs; and a node reporting interference information to the base station, e.g., the vehicle D. Although the node determined by the base station to receive the resource coordination message is generally one of these two categories of nodes in the examples, the node determined by the base station to receive the resource coordination message, or the node receiving the resource coordination message transmitted by the base station may not necessarily be one of these two categories of nodes, and they are described only by way of an example. In fact, the node determined by the base station to receive the resource coordination message can be determined as needed, as described above.

In a first embodiment, resources are coordinated without any resource collision.

Figure 3:
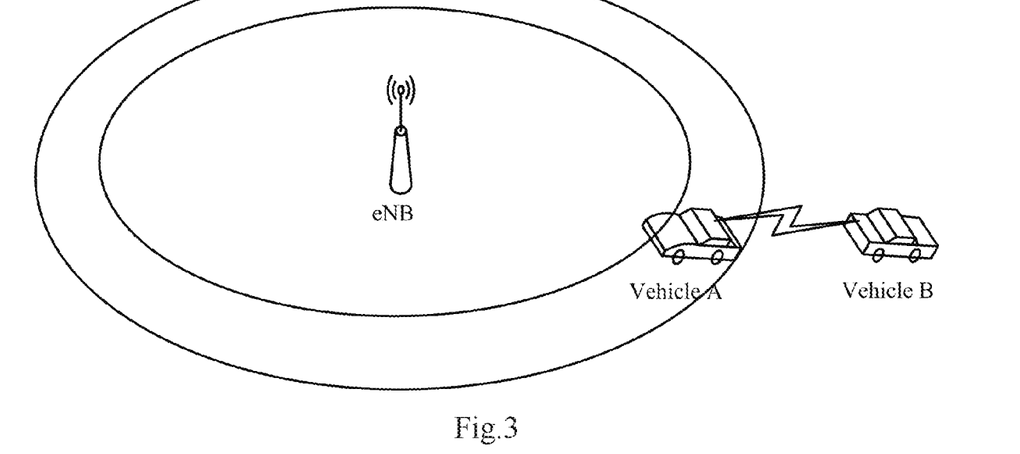
FIG. 3 is a schematic diagram of nodes inside and outside a coverage area without any resource collision according to an embodiment of the application.

FIG. 3 is a schematic diagram of nodes in and out of a coverage area without any resource collision, and as illustrated, the vehicle A is located in the edge area in the coverage area of the base station, and the vehicle B is located out of the coverage area of the base station.

There are two possible scenarios for the vehicles.

In a first scenario, the vehicle A transmitting a D2D SS constantly has not received a synchronization signal transmitted from any node out of the coverage area, so no resource coordination message will be transmitted.

In a second scenario, the vehicle A can receive a D2D SS transmitted by the vehicle B out of the coverage area, and a resource coordination message will be transmitted.

There is the following implementation in the second scenario in which resource coordination is required.

In the first operation: the vehicle A can receive the D2D SS transmitted by the vehicle B out of the coverage area, and since there are different D2D SSs in and out of the coverage of an eNB, the vehicle A determines that the vehicle A is located at the edge of the coverage area of the base station, and that there is the vehicle B, which is a node out of the coverage area, around the vehicle A, so a resource coordination message will be transmitted.

Particularly when it is the first time for the vehicle A to satisfy the condition that it is located at the edge of the coverage area of the base station, and that there is a node out of the coverage area (the vehicle B), around it, it reports a request message immediately to the base station, where the message can include the following contents: an ID of the node, which is the vehicle A; positional information of the node, which is the vehicle A: a longitude, a latitude, and a lane; and traveling information of the node, which is the vehicle A: a velocity, a traveling direction, and an acceleration or deceleration.

In the second operation: the base station checks to see that there is currently no interference information reported, upon reception of the resource coordination request message reported by the vehicle A, and selects a node for resource coordination as the vehicle A according to the position and traveling information of the vehicle A.

The base station organizes and transmits resource information for centralized scheduling and allocation, and since there is no interference information, but only resource occupancy information, the base station organizes information about the centrally scheduled node(s) in the spatial multiplexing distance from the edge node to the base station into a resource coordination message, and transmits it to the reporting node: the ID(s) of the node(s) in the coverage area of the base station; and resource occupancy information of the node(s) in the coverage area of the base station.

In the third operation: the vehicle A, which is the node at the edge of the coverage area of the base station, receives the resource coordination message transmitted by the base station, and organizes and transmits the resource coordination message for centralized scheduling by broadcasting it.

In the fourth operation: the vehicle B, which is the node out of the coverage area of the base station, receives the resource coordination message as an input for making a distributed resource collision judgment, analyzes it for possible resource collision, and adjusts its resource with possible collision.

In a second embodiment, resources need to be coordinated with strong interference information.

Figure 4:
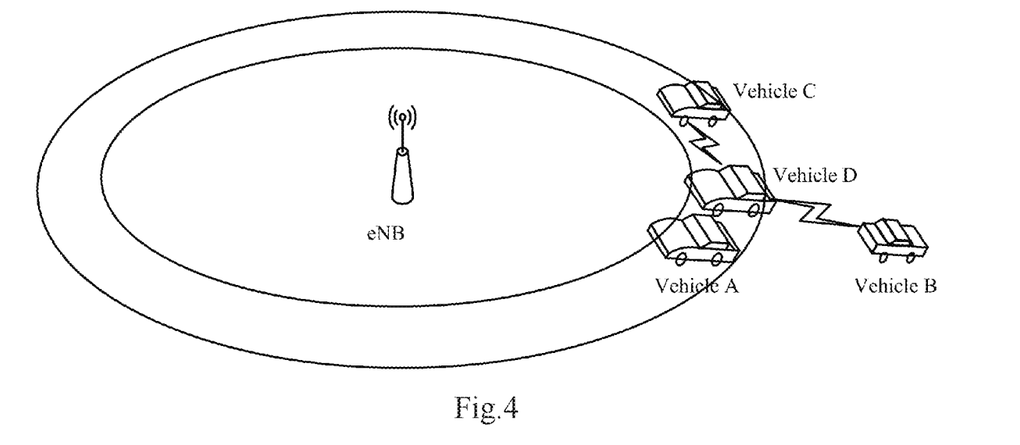
FIG. 4 is a schematic diagram of nodes inside and outside a coverage area with strong interference reported according to an embodiment of the application.

FIG. 4 is a schematic diagram of nodes in and out of a coverage area with strong interference reported, and as illustrated, the vehicles A and D are located in the edge area in the coverage area of the base station, the vehicle C is located in the coverage area of the base station, and the vehicle B is located out of the coverage area, where the vehicle B and the vehicle C transmit over the same timeslot resource, and the vehicle D detects that the transmission resource of the vehicle B collides with that of the vehicle C, so there may be the following implementation.

In the first operation: since the vehicle A is located in the edge area in the coverage area of the base station, it needs to transmit a D2D SS constantly. When the vehicle A receives a D2D SS transmitted from the vehicle B out of the coverage area, since there are different D2D SSs in and out of the coverage of an eNB, the vehicle A determines that the vehicle A is located at the edge of the coverage area of the base station, and that there is the vehicle B, which is a node out of the coverage area, around the vehicle A.

Particularly when it is the first time for the vehicle A to satisfy the condition that it is located at the edge of the coverage area of the base station, and that there is a node out of the coverage area (the vehicle B), around it, it reports a request message immediately to the base station, where the message can include the following contents: an ID of the node, which is the vehicle A; positional information of the node, which is the vehicle A: a longitude, a latitude, and a lane; and traveling information of the node, which is the vehicle A: a velocity, a traveling direction, and an acceleration or deceleration.

In the second operation: the vehicle D, which is a node at the edge of the coverage area, detects strong interference, and thereafter reports a strong interference indicator to the base station.

The base station searches for information about the centrally scheduled and allocated node(s) according to the time-frequency resource(s) with strong interference, and finds that a node with resource collision is the vehicle C in the coverage area of the base station, so the base station reallocates a resource for the vehicle C; and also the base station does not find information about any other node with resource collision with the vehicle C, and this indicates that the other node(s) with resource collision is(or are) located out of the coverage area of the network. Thereafter the base station configures the vehicle D, which is a reporting node, to broadcast the resource collision condition.

The base station receives the resource coordination request message reported by the vehicle A. and further receives the strong interference indicator reported by the vehicle D, which is a node at the edge of the coverage area of the base station, and the base station can select a node to transmit a resource coordination message, as follows according to the positions and traveling information of the vehicle A and the vehicle D.

1. It is determined that the vehicle D is currently closer than the vehicle A to the edge of the coverage area of the base station, and the vehicle D is selected as a node currently in the edge area.

2. Existing time-frequency resources of the base station support transmission of resource coordination messages to both the vehicle A and the vehicle D, so both the vehicle A and the vehicle D are selected to transmit resource coordination messages.

The base station organizes and transmits information about the centrally scheduled and allocated resource(s) to the vehicle node(s) to transmit the information, where the information includes resource occupancy information and strong interference information, and the base station organizes information about the centrally scheduled and allocated node(s) in the spatial multiplexing distance from the edge node to the base station into a resource coordination message, which can include the following two categories of information.

1) Resource Occupancy Information of the Node(s) in the Coverage Area of the Base Station.

The information, to be transmitted by the base station, about the centrally scheduled and allocated node(s) in the spatial multiplexing distance from the vehicle node to the base station can include the following contents: the ID(s) of the node(s) in the coverage area of the base station, including the ID(s) of such vehicle(s) that the node(s) centrally scheduled by the base station in the spatial multiplexing distance can be found; and resource occupancy information of the node(s) in the coverage area of the base station, including resource occupancy information of the node(s) above.

2) Resource Collision Information of the Node(s) Out of the Coverage Area of the Base Station.

The base station organizes the resource collision information of the node(s), out of the coverage area of the base station, determined by the node(s) at the edge of the coverage area of the base station, including the following contents: resource occupancy information of the node(s) out of the coverage area of the base station, where since the ID(s) of the node(s) out of the coverage area is(or are) unavailable, only information about the resource with resource collision may be filled in.

In the third operation: the node(s) at the edge of the coverage area of the base station receives (or receive) the resource coordination message(s) transmitted by the base station, and transmits (or transmit) the resource coordination message(s) for centralized scheduling by broadcasting.

In the fourth operation: the vehicle B, which is the node out of the coverage area of the base station, receives the resource coordination message as an input for making a distributed resource collision judgment, analyzes it for possible resource collision, and adjusts its resource with possible collision.

In a third embodiment, resources need to be coordinated with strong interference information and relatively strong interference information.

Figure 5:
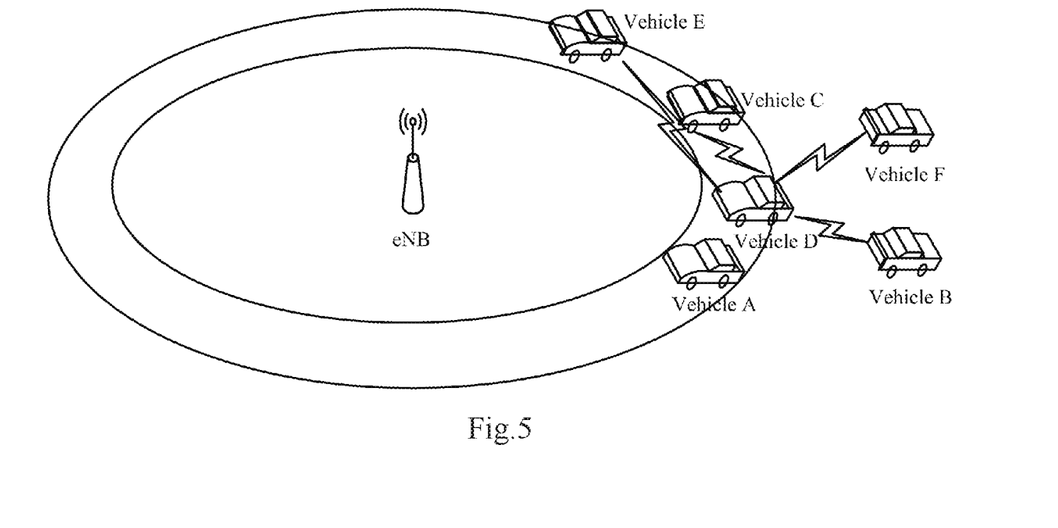
FIG. 5 is a schematic diagram of nodes inside and outside a coverage area without any resource collision according to an embodiment of the application.

FIG. 5 is a schematic diagram of nodes in and out of a coverage area without any resource collision, and as illustrated, the vehicle A, the vehicle D, and the vehicle C are located in the edge area in the coverage area of the base station, the vehicle E is located in the coverage area of the base station, and the vehicle B and the vehicle F are located out of the coverage area of the base station. Where the vehicle B and the vehicle C transmit over the same time-frequency resource and the vehicle D detects that the transmission resource of the vehicle B collides with that of the vehicle C. Thus there may be the following implementation.

In the first operation: the vehicle A in the coverage area of the base station transmits a D2D SS constantly. When the vehicle A receives a D2D SS transmitted from the vehicle B out of the coverage area, since there are different D2D SSs in and out of the coverage of an eNB, the vehicle A determines that the vehicle A is located at the edge of the coverage area of the base station, and that there is the vehicle B, which is a node out of the coverage area, around the vehicle A.

When it is the first time for the vehicle A to satisfy the condition that it is located at the edge of the coverage area of the base station, and that there is a node out of the coverage area (the vehicle B), around it, it reports a request message immediately to the base station, where the message can include the following contents: an ID of the node, which is the vehicle A; positional information of the node, which is the vehicle A: a longitude, a latitude, and a lane; and traveling information of the node, which is the vehicle A: a velocity, a traveling direction, and an acceleration or deceleration.

In the second operation: the vehicle D, which is a node at the edge of the coverage area, detects strong interference, and thereafter reports a strong interference indicator to the base station.

The base station searches for information about the centrally scheduled and allocated node(s) according to the time-frequency resource(s) with strong interference, and finds that a node with resource collision is the vehicle C in the coverage area of the base station, so the base station reallocates a resource for the vehicle C; and also the base station does not find information about any other node with resource collision with the vehicle C, and this indicates that the other node(s) with resource collision is(or are) located out of the coverage area of the network. Thereafter the base station configures the vehicle D, which is a reporting node, to broadcast the resource collision condition.

The vehicle C, which is a node at the edge of the coverage area, detects relatively strong interference, and reports a relatively strong interference indicator to the base station, where the relatively strong interference indicator includes an ID of the node, which is the vehicle F, decoded successfully by the vehicle C, and information about the resource(s) with resource collision. The base station searches for information about the centrally scheduled node(s) according to the timeslot resource(s) with relatively strong interference, and finds that a node with resource collision is the vehicle E in the coverage area of the base station, and the base station reallocates a resource for the vehicle E. If an ID of the vehicle E is decoded successfully by the vehicle C, then the relatively strong interference indicator will report the ID of the node, which is the vehicle E, and information about the resource(s) with resource collision. The base station searches for information about the centrally scheduled node(s) according to the timeslot resource(s) with relatively strong interference, but does not find information about any other node with resource collision with the vehicle E, and this indicates that the other node(s) with resource collision is(or are) located out of the coverage area of the network. In order to guarantee reliable reception out of the coverage area, the node(s) at the edge of the coverage area needs (or need) to broadcast the resource collision information.

The base station receives the resource coordination request message reported by the vehicle A, and further receives the strong interference indicator reported by the vehicle D, which is a node at the edge of the coverage area; and the relatively strong interference indicator reported by the vehicle C, which is a node at the edge of the coverage area. The base station can select a node to transmit a resource coordination message, as follows according to the positions and traveling information of the vehicle A, the vehicle D, and the vehicle C.

1. It is determined that the vehicle D is currently closer than the vehicle A and the vehicle C to the edge of the coverage area of the base station, and only the vehicle D is selected as a node currently in the edge area.

2. Existing time-frequency resources of the base station support only transmission of resource coordination messages to both the vehicle A and the vehicle D, so both the vehicle A and the vehicle D are selected to transmit resource coordination messages.

3. It is determined that existing time-frequency resources of the base station support transmission of resource coordination messages to all the vehicles, so all of the vehicle A, the vehicle C, and the vehicle D are selected to transmit resource coordination messages.

The base station organizes and transmits information about centrally scheduled and allocated resource(s) to the node(s) to transmit the information, where the information includes resource occupancy information and strong interference information. The base station also configures transmission resource(s) according to the content(s) of the message(s). Where if the contents of the messages are the same, then the plurality of transmitting nodes may be configured to transmit synchronously at the same time, or if the contents of the messages are different, then transmission resources of the transmitting nodes may be configured respectively. The base station organizes information about the centrally scheduled and allocated node(s) in the spatial multiplexing distance from the edge node to the base station into a resource coordination message, which can include the following two categories of information.

1) Resource Occupancy Information of the Node(s) in the Coverage Area of the Base Station.

The information about the centrally scheduled and allocated node(s) in the spatial multiplexing distance from the edge node to the base station includes the following contents: the ID(s) of the node(s) in the coverage area of the base station, including the ID(s) of such vehicle(s) that the node(s) centrally scheduled by the base station in the spatial multiplexing distance can be found; and resource occupancy information of the node(s) in the coverage area of the base station, including resource occupancy information of the node(s) above.

2) Resource Collision Information of the Node(s) Out of the Coverage Area of the Base Station.

The base station organizes the resource collision information of the node(s), out of the coverage area of the base station, determined by the node(s) at the edge of the coverage area of the base station, including the following contents: resource occupancy information of the node(s) out of the coverage area of the base station, where since the ID(s) of the node(s) out of the coverage area is (or are) unavailable in the case of strong interference, only the information about the resource with resource collision may be filled in; and in the case of relatively strong interference, the ID(s) of the node(s), out of the coverage area, which can be decoded successfully, and the information about the resource with resource collision need to be included.

In the third operation: the node(s) at the edge of the coverage area of the base station receives (or receive) the resource coordination message(s) transmitted by the base station, and transmits (or transmit) the resource coordination message(s) for centralized scheduling by broadcasting.

In the fourth operation: the vehicle B, and the vehicle F, which are the nodes out of the coverage area of the base station, receive the resource coordination messages as an input for making a distributed resource collision judgment, analyze them for possible resource collision, and adjust their resources with possible collision.

Based upon the same inventive concept, embodiments of the application further provide an apparatus for transmitting resource information, and an apparatus for broadcasting resource information, and since these apparatuses address the problem under a similar principle to the method for transmitting resource information, and the method for broadcasting resource information, reference can be made to the implementations of the methods for implementations of these apparatuses, and a repeated description thereof will be omitted here.

Figure 6:
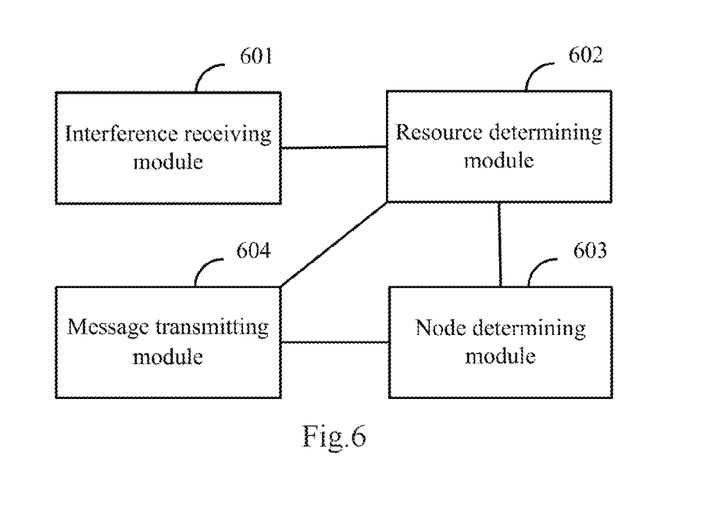
FIG. 6 is a schematic structural diagram of an apparatus for transmitting resource information according to an embodiment of the application.

FIG. 6 is a schematic structural diagram of the apparatus for transmitting resource information, and as illustrated, the apparatus can include: a resource determining module 602 configured to determine a resource accessed by a second type of node, and a resource accessed by a first type of node, where the first type of node is a node in a signal coverage area of a base station, and the second type of node is a node out of the signal coverage area of the base station; a node determining module 603 configured to determine a node of the first type to receive a resource coordination message; and a message transmitting module 604 configured to transmit the resource coordination message to the determined node of the first type; and to instruct the determined node of the first type to broadcast a content of the resource coordination message, where the resource coordination message carries resource information of the first type of node, and resource information of the second type of node.

In an implementation, the resource determining module can be further configured to determine the resource accessed by the second type of node according to interference information.

In an implementation, the apparatus can further include: an interference receiving module 601 configured to receive the interference information reported by the first type of node; and the resource determining module is further configured to determine the resource accessed by the second type of node according to the interference information reported by the first type of node.

In an implementation, the resource determining module can be further configured to adjust a resource accessed by a related node of the first type according to the reported interference information before transmitting the resource coordination message to the determined node of the first type: and the message transmitting module is further configured to transmit the resource coordination message to the determined node of the first type by enabling information about adjusted resource accessed by the first type of node as the resource information of the first type of node carried in the resource coordination message.

In an implementation, the message transmitting module can be further configured, if it is determined from the interference information that the first type of node reporting the interference information cannot decode a received transmitted signal due to interference, to carry in the resource coordination message information about the resource accessed by the second type of node, determined according to the interference information reported by the first type of node; or if it is determined from the interference information that the first type of node reporting the interference information is capable of decoding the received transmitted signal despite the interference, to carry in the resource coordination message the information about the resource accessed by the second type of node, determined according to the interference information reported by the first type of node, and to further carry in the resource coordination message an identifier of a terminal for which the transmitted signal can be decoded.

In an implementation, the node determining module is further configured to determine the node of the first type to receive the resource coordination message by determining a node of the first type capable of determining the resource accessed by the second type of node according to the interference information reported by the first type of node as the node of the first type to receive the resource coordination message.

In an implementation, the message transmitting module is further configured to instruct the determined node of the first type to broadcast the content of the resource coordination message by instructing the determined node of the first type to broadcast the content of the resource coordination message in a D2D communication area thereof.

In an implementation, the first type of node can be a node requesting the base station to transmit the resource coordination message.

In an implementation, the first type of node can be a node receiving different D2D SSs.

Figure 7:
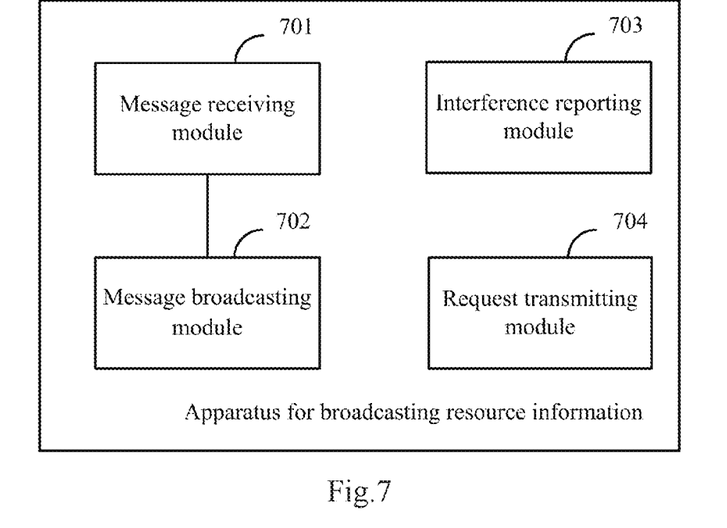
FIG. 7 is a schematic structural diagram of an apparatus for broadcasting resource information according to an embodiment of the application.

FIG. 7 is a schematic structural diagram of an apparatus for broadcasting resource information, and as illustrated, the apparatus can include: a message receiving module 701 configured to receive a resource coordination message transmitted by a base station, and to be instructed by the base station to broadcast a content of the resource coordination message, where the resource coordination message carries resource information of a first type of node, and resource information of a second type of node, and the first type of node is a node in a signal coverage area of the base station, and the second type of node is a node out of the signal coverage area of the base station; and a message broadcasting module 702 configured to broadcast the content of the resource coordination message.

In an implementation, the apparatus can further include: an interference reporting module 703 configured to report interference information to the base station.

In an implementation, the interference reporting module can be further configured to indicate in the interference information that a received transmitted signal cannot be decoded due to interference, or the received transmitted signal can be decoded despite the interference; and the message receiving module is further configured, if the interference information indicates that the received transmitted signal cannot be decoded due to the interference, to receive the resource coordination message carrying information about the resource accessed by the second type of node, determined according to the interference information reported by the first type of node; or if the interference information indicates that the received transmitted signal can be decoded despite the interference, to receive the resource coordination message carrying the information about the resource accessed by the second type of node, determined according to the interference information reported by the first type of node, and further carrying an identifier of a terminal for which the transmitted signal can be decoded.

In an implementation, the apparatus can further include: a request transmitting module 704 configured to transmit a request for the resource coordination message to the base station, before receiving the resource coordination message transmitted by the base station.

In an implementation, the request transmitting module can be further configured to transmit the request for the resource coordination message to the base station upon determining that different D2D SSs are received.

In an implementation, the message broadcasting module can be further configured to broadcast the content of the resource coordination message by broadcasting the content of the resource coordination message in a D2D communication area.

For the sake of a convenient description, the respective components of the apparatuses above have been described respectively as various modules or units in terms of their functions. Of course, the functions of the respective modules or units can be performed in the same one or more pieces of software or hardware in the embodiments of the application.

The technical solutions according to the embodiments of the application can be implemented as follows.

Figure 8:
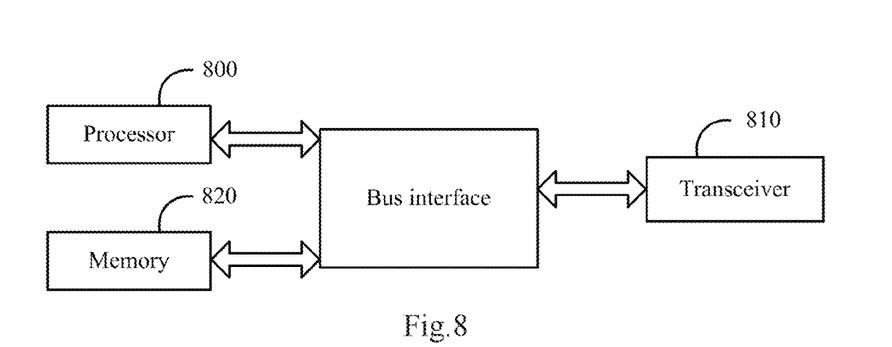
FIG. 8 is a schematic structural diagram of a base station according to an embodiment of the application.

FIG. 8 is a schematic structural diagram of a base station according to an embodiment of the application, and as illustrated, the base station includes: a processor 800 configured to read and execute programs in a memory 820 to determine a resource accessed by a second type of node, and a resource accessed by a first type of node, and determine a node of the first type to receive a resource coordination message, where the first type of node is a node in a signal coverage area of the base station, and the second type of node is a node out of the signal coverage area of the base station; and a transceiver 810 configured to be controlled by the processor 800 to transmit data, and to transmit the resource coordination message to the determined node of the first type, and to instruct the determined node of the first type to broadcast a content of the resource coordination message, where the resource coordination message carries resource information of the first type of node, and resource information of the second type of node.

In an implementation, the resource accessed by the second type of node is determined according to interference information.

In an implementation, the interference information is reported by the first type of node.

In an implementation, the processor 800 is further configured to adjust a resource accessed by a related node of the first type according to the reported interference information before the transceiver 810 is controlled to transmit the resource coordination message to the determined node of the first type; and the transceiver 810 is configured to transmit the resource coordination message to the determined node of the first type by enabling information about adjusted resource accessed by the first type of node as the resource information of the first type of node carried in the resource coordination message.

In an implementation, if it is determined from the interference information that the first type of node reporting the interference information cannot decode a received transmitted signal due to interference, then the resource coordination message will carry information about the resource accessed by the second type of node, determined according to the interference information reported by the first type of node; or if it is determined from the interference information that the first type of node reporting the interference information is capable of decoding the received transmitted signal despite the interference, then the resource coordination message will carry the information about the resource accessed by the second type of node, determined according to the interference information reported by the first type of node, and the resource coordination message will further carry an identifier of a terminal for which the transmitted signal can be decoded.

In an implementation, when determining the node of the first type to receive a resource coordination message, a node of the first type capable of determining the resource accessed by the second type of node according to the interference information reported by the first type of node is determined as the node of the first type to receive the resource coordination message.

In an implementation, instructing the determined node of the first type to broadcast the content of the resource coordination message is executed by instructing the determined node of the first type to broadcast the content of the resource coordination message in a D2D communication area thereof.

In an implementation, the first type of node is a node requesting the base station to transmit the resource coordination message.

In an implementation, the first type of node is a node receiving different D2D SSs.

Here in FIG. 8, the bus architecture can include any number of interconnecting buses and bridges to particularly link together various circuits including one or more processors represented by the processor 800, and one or more memories represented by the memory 820. The bus architecture can further link together various other circuits, e.g., peripheral devices, manostats, power management circuits, etc., all of which are well known in the art, so a further description thereof will be omitted in this context. The bus interface serves as an interface. The transceiver 810 can be a number of elements including a transmitter and a receiver, which provide units for communication with various other devices over a transmission medium. The processor 800 is responsible for managing the bus architecture and performing normal processes, and the memory 820 can store data for use by the processor 800 in performing the operations.

Figure 9:
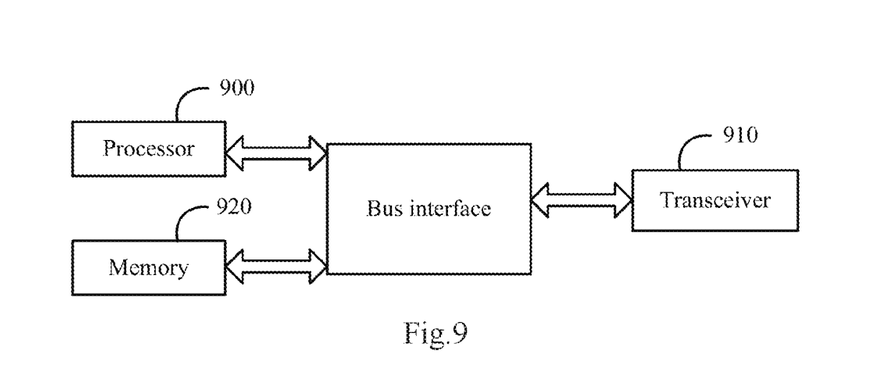
FIG. 9 is a schematic structural diagram of a node according to an embodiment of the application.

FIG. 9 is a schematic structural diagram of a node according to an embodiment of the application, and as illustrated, the node includes: a processor 900 configured to read and execute programs in a memory 920 to process data as needed for a transceiver; and the transceiver 910 configured to be controlled by the processor 900 to transmit data, and to receive a resource coordination message transmitted by a base station, and to be instructed by the base station to broadcast a content of the resource coordination message, where the resource coordination message carries resource information of a first type of node and resource information of a second type of node, and the first type of node is a node in a signal coverage area of the base station, the second type of node is a node out of the signal coverage area of the base station; and to broadcast the content of the resource coordination message.

In an implementation, the transceiver 910 is further configured to be controlled by the processor 900 to report interference information to the base station.

In an implementation, the processor 900 is further configured to indicate in the interference information that a received transmitted signal cannot be decoded due to interference, or the received transmitted signal can be decoded despite the interference; and if the interference information indicates that the received transmitted signal cannot be decoded due to the interference, then the resource coordination message carries information about the resource accessed by the second type of node, determined according to the interference information reported by a first type of node; or if the interference information indicates that the received transmitted signal can be decoded despite the interference, then the resource coordination message carries the information about the resource accessed by the second type of node, determined according to the interference information reported by the first type of node, and further carries an identifier of a terminal for which the transmitted signal can be decoded.

In an implementation, the transceiver 910 is further configured to be controlled by the processor 900 to transmit a request for the resource coordination message to the base station, before receiving the resource coordination message transmitted by the base station.

In an implementation, the processor 900 is configured to control the transceiver 910 to transmit the request for the resource coordination message to the base station upon determining that different D2D SS are received.

In an implementation, the content of the resource coordination message is broadcasted by broadcasting the content of the resource coordination message in a D2D communication area.

Here in FIG. 9, the bus architecture can include any number of interconnecting buses and bridges to particularly link together various circuits including one or more processors represented by the processor 900, and one or more memories represented by the memory 920. The bus architecture can further link together various other circuits, e.g., peripheral devices, manostats, power management circuits, etc., all of which are well known in the art, so a further description thereof will be omitted in this context. The bus interface serves as an interface. The transceiver 910 can be a number of elements including a transmitter and a receiver, which provide units for communication with various other devices over a transmission medium. The processor 900 is responsible for managing the bus architecture and performing normal processes, and the memory 920 can store data for use by the processor 900 in performing the operations.

In summary, in the technical solutions according to the embodiments of the application, when it is determined that the node is located at the edge of the coverage area of the base station, and that there is a node, out of the coverage area, around it, the base station organizes and transmits the resource coordination message for centralized scheduling, according to the request reported by the node at the edge of the coverage area of the network, and the interference information reported by the node in the coverage area of the network.

As compared with the coordination mechanism between the nodes in and out of the coverage area in the prior art, in the technical solutions according to the embodiments of the application, the node at the edge of the coverage area of the network transmits the resource coordination message, so that the resources of the nodes at the edge of the coverage area, and out of the coverage area are coordinated, and in the technical solutions according to the embodiments of the application, the coverage conditions of the network are determined accurately, and the resources are coordinated by exchanging the messages over the network, to thereby guarantee the continuity of the resource of the node moving at the edge of the coverage area of the network, alleviating resource collision, and improving the utilization ratio of the resources in the system.

Those skilled in the art shall appreciate that the embodiments of the application can be embodied as a method, a system or a computer program product. Therefore the application can be embodied in the form of an all-hardware embodiment, an all-software embodiment or an embodiment of software and hardware in combination. Furthermore the application can be embodied in the form of a computer program product embodied in one or more computer useable storage mediums (including but not limited to a disk memory, an optical memory, etc.) in which computer useable program codes are contained.

The application has been described in a flow chart and/or a block diagram of the method, the device (system) and the computer program product according to the embodiments of the application. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the application have been described, those skilled in the art benefiting from the underlying inventive concept can make additional modifications and variations to these embodiments. Therefore the appended claims are intended to be construed as encompassing the preferred embodiments and all the modifications and variations coming into the scope of the application.

Evidently those skilled in the art can make various modifications and variations to the application without departing from the spirit and scope of the application. Thus the application is also intended to encompass these modifications and variations thereto so long as the modifications and variations come into the scope of the claims appended to the application and their equivalents.

The invention claimed is:

1. A method for transmitting resource information, the method comprising:
   receiving interference information reported by a first type of node;
   determining a resource accessed by a second type of node according to the interference information, and a resource accessed by the first type of node, wherein the first type of node is a node in a signal coverage area of a base station, and the second type of node is a node out of the signal coverage area of the base station;
   determining a node of the first type to receive a resource coordination message, wherein the resource coordination message carries resource information of the first type of node, and resource information of the second type of node; and
   transmitting the resource coordination message to the determined node of the first type, and instructing the determined node of the first type to broadcast a content of the resource coordination message;
   wherein determining the node of the first type to receive the resource coordination message comprises: selecting the node of the first type from nodes of the first type capable of reporting the interference information to receive the resource coordination message;
   wherein when it is determined from the interference information that the first type of node reporting the interference information cannot decode a received transmitted signal due to interference, then the resource coordination message carries information about the resource accessed by the second type of node, determined according to the interference information reported by the first type of node; or
   when it is determined from the interference information that the first type of node reporting the interference information is capable of decoding the received transmitted signal despite the interference, then the resource coordination message carries the information about the resource accessed by the second type of node, determined according to the interference information reported by the first type of node, and the resource coordination message further carries an identifier of a terminal for which the transmitted signal can be decoded.

2. The method according to claim 1, wherein the interference information is determined by:
   receiving the interference information reported by the first type of node.

3. The method according to claim 1, wherein before the resource coordination message is transmitted to the determined node of the first type, the method further comprises:
   adjusting a resource accessed by a related node of the first type according to the reported interference information; and
   transmitting the resource coordination message to the determined node of the first type comprises:
   transmitting the resource coordination message to the determined node of the first type by enabling information about adjusted resource accessed by the first type of node as the resource information of the first type of node carried in the resource coordination message.

4. The method according to claim 1, wherein instructing the determined node of the first type to broadcast the content of the resource coordination message is executed by instructing the determined node of the first type to broadcast the content of the resource coordination message in a Device to Device (D2D) communication area thereof.

5. The method according to claim 1, wherein the first type of node is a node requesting the base station to transmit the resource coordination message.

6. The method according to claim 1, wherein the first type of node is a node receiving different Device to Device Synchronization Sequences (D2D SSs).

7. A method for broadcasting resource information, the method comprising:
   reporting, by a node of a first type, interference information to a base station;
   receiving, by a node of a first type, a resource coordination message transmitted by the base station, and being instructed by the base station to broadcast a content of the resource coordination message, wherein the resource coordination message carries resource information of a first type of node, and resource information of a second type of node; and the first type of node is a node in a signal coverage area of the base station, and the second type of node is a node out of the signal coverage area of the base station, wherein a resource accessed by the second type of node is determined by the base station according to the interference information, and the node of the first type is a node of the first type selected from nodes of the first type capable of reporting the interference information to receive the resource coordination message; and
   broadcasting the content of the resource coordination message;
   wherein the method further comprises:
   indicating in the interference information that a received transmitted signal cannot be decoded due to interference, or the received transmitted signal can be decoded despite the interference; and when the interference information indicates that the received transmitted signal cannot be decoded due to the interference, then the resource coordination message carries information about the resource accessed by the second type of node, determined according to the interference information reported by the first type of node; or when the interference information indicates that the received transmitted signal can be decoded despite the interference, then the resource coordination message carries the information about the resource accessed by the second type of node, determined according to the interference information reported by the first type of node, and further carries an identifier of a terminal for which the transmitted signal can be decoded.

8. The method according to claim 7, wherein before receiving the resource coordination message transmitted by the base station, the method further comprises:

transmitting a request for the resource coordination message to the base station upon determining that different D2D SSs are received.

9. The method according to claim 7, wherein broadcasting the content of the resource coordination message comprises:

broadcasting the content of the resource coordination message in a D2D communication area.

10. An apparatus for transmitting resource information, the apparatus comprising at least one processor and a memory; wherein:

the memory is configured to store computer readable program codes; and the at least one processor is configured to execute the computer readable program codes to:

receive interference information reported by a first type of node;

determine a resource accessed by a second type of node according to the interference information, and a resource accessed by the first type of node, wherein the first type of node is a node in a signal coverage area of a base station, and the second type of node is a node out of the signal coverage area of the base station;

determine a node of the first type to receive a resource coordination message by selecting the node of the first type from nodes of the first type capable of reporting interference information to receive the resource coordination message, wherein the resource coordination message carries resource information of the first type of node, and resource information of the second type of node; and transmit the resource coordination message to the determined node of the first type; and instruct the determined node of the first type to broadcast a content of the resource coordination message;

wherein the at least one processor is further configured to execute the computer readable program codes to:

when it is determined from the interference information that the first type of node reporting the interference information cannot decode a received transmitted signal due to interference, carry in the resource coordination message information about the resource accessed by the second type of node, determined according to the interference information reported by the first type of node; or when it is determined from the interference information that the first type of node reporting the interference information is capable of decoding the received transmitted signal despite the interference, carry in the resource coordination message the information about the resource accessed by the second type of node, determined according to the interference information reported by the first type of node, and further carry in the resource coordination message an identifier of a terminal for which the transmitted signal can be decoded.

11. The apparatus according to claim 10, wherein the at least one processor is further configured to execute the computer readable program codes to:

adjust a resource accessed by a related node of the first type according to the reported interference information before transmitting the resource coordination message to the determined node of the first type; and transmit the resource coordination message to the determined node of the first type by enabling information about adjusted resource accessed by the first type of node as the resource information of the first type of node carried in the resource coordination message.

12. The apparatus according to claim 10, wherein the at least one processor is further configured to execute the computer readable program codes to: instruct the determined node of the first type to broadcast the content of the resource coordination message by instructing the determined node of the first type to broadcast the content of the resource coordination message in a D2D communication area thereof.

13. The apparatus according to claim 10, wherein the first type of node is a node requesting the base station to transmit the resource coordination message; or the first type of node is a node receiving different D2D SSs.

* * * * *